United States Patent
Kamen (10) Patent No.: US 8,073,862 B2
(45) Date of Patent: Dec. 6, 2011

(54) METHODS AND APPARATUSES FOR VIDEO ON DEMAND (VOD) METADATA ORGANIZATION

(75) Inventor: Yakov Kamen, Cupertino, CA (US)

(73) Assignee: Hillcrest Laboratories, Inc., Rockville, MD (US)

( * ) Notice: Subject to any disclaimer, the term of this patent is extended or adjusted under 35 U.S.C. 154(b) by 1258 days.

(21) Appl. No.: 11/140,885

(22) Filed: May 31, 2005

(65) Prior Publication Data

US 2005/0278364 A1 Dec. 15, 2005

Related U.S. Application Data

(60) Provisional application No. 60/575,313, filed on May 28, 2004.

(51) Int. Cl.
G06F 7/00 (2006.01)
G06F 17/30 (2006.01)

(52) U.S. Cl. ............... 707/769; 709/218; 725/87

(58) Field of Classification Search ............ None
See application file for complete search history.

(56) References Cited

U.S. PATENT DOCUMENTS

| | | | |
|---|---|---|---|
| 5,721,829 A | 2/1998 | Dunn et al. | |
| 6,311,329 B1 | 10/2001 | Terakado et al. | |
| 6,502,139 B1 * | 12/2002 | Birk et al. ................ | 709/233 |
| 6,804,708 B1 | 10/2004 | Jerding et al. | |
| 7,096,481 B1 | 8/2006 | Forecast et al. | |
| 2002/0042920 A1 | 4/2002 | Thomas et al. | |
| 2002/0049971 A1 | 4/2002 | Augenbraun et al. | |
| 2002/0138500 A1 * | 9/2002 | Bechtel et al. .............. | 707/104.1 |
| 2003/0002862 A1 * | 1/2003 | Rodriguez et al. ............ | 386/125 |
| 2003/0014546 A1 * | 1/2003 | Kikinis et al. ................ | 709/250 |
| 2003/0023980 A1 * | 1/2003 | Kikinis et al. ................ | 725/100 |
| 2003/0046698 A1 * | 3/2003 | Kamen et al. .................... | 725/53 |
| 2003/0145085 A1 * | 7/2003 | Baldwin et al. ................ | 709/225 |
| 2003/0149975 A1 * | 8/2003 | Eldering et al. ................ | 725/34 |
| 2004/0103120 A1 * | 5/2004 | Fickle et al. ................ | 707/104.1 |
| 2004/0268393 A1 | 12/2004 | Hunleth et al. | |
| 2005/0010950 A1 * | 1/2005 | Carney et al. .................... | 725/45 |
| 2005/0108772 A1 | 5/2005 | Crinon et al. | |
| 2005/0182792 A1 | 8/2005 | Israel et al. | |
| 2007/0005653 A1 * | 1/2007 | Marsh ........................ | 707/104.1 |
| 2007/0294740 A1 * | 12/2007 | Drake et al. .................. | 725/131 |

FOREIGN PATENT DOCUMENTS

| | | |
|---|---|---|
| CN | 1308815 A | 8/2001 |
| EP | 1309150 A2 | 5/2003 |
| WO | 99/57904 A1 | 11/1999 |
| WO | 01/56290 A1 | 8/2001 |

OTHER PUBLICATIONS

International Search Report for PCT/US05/19090 mailed Apr. 19, 2007.

(Continued)

Primary Examiner — Pierre Vital
Assistant Examiner — Loan T Nguyen
(74) Attorney, Agent, or Firm — Potomac Patent Group PLLC (57) ABSTRACT

A method and system for optimizing the transmission of VOD metadata is disclosed. VOD metadata can be filtered, processed and/or organized prior to being packetized for transmission to client devices. The filtering, processing and/or organization can, for example, be based on a time duration associated with VOD media items and/or by groups of information elements available within the sets of metadata.

11 Claims, 10 Drawing Sheets

OTHER PUBLICATIONS

Written Opinion for PCT/US05/19090 mailed Apr. 19, 2007.
European Search Report from corresponding European Application No. EP 05756422 dated Jul. 13, 2009.
Chinese Office Action in corresponding Chinese Patent Application No. 200580017125.4, issued Mar. 13, 2009.
English translation of a Chinese Office Action issued on Dec. 18, 2009, in the corresponding Chinese Application No. 200580017125.4.
English translation of Office Action issued on Nov. 2, 2010 in corresponding Chinese Patent No. 2005800171254.

Smith, D., et al., "Testing Data Broadcast and Multimedia Home Platform (MHP) Services Within the DVB Multiplex," IBC 2002 Conference Proceedings, pp. 1-11, Sep. 2002.
Gordon-Kanouff, Y., "Managing On-Demand: The Impending Challenges of Ramped Up Content," Communications Technology, pp. 1-4, Sep. 2002.
Rockwell, D., "Preparing for the Headend of the Future," Headend Systems, Scientific-Atlanta Inc., pp. 1-5, Jul. 2001.

* cited by examiner

FIG. 2

DRAMA

APOLLO 13 (1995)
Length: 120 Minutes    Price: $3.99

BUY/WATCH TRAILER/BACK

Massively popular, fast-paced retelling of near-disaster space mission. Much to enjoy for fans of suspense and special effects. Well-developed characters appeal even to those who don't like typical Hollywood epics.

Actors: Tom Hanks, Bill Paxton, Kevin Bacon, Gary Sinise, Ed Harris

APOLLO 13

Tom Hanks

American leading actor Tom Hanks has become one of the most popular stars in contemporary American cinema. Born July 9, 1956, in Concord, CA.

Rated by Empire Magazine as 17th out of The Top 100 Movie Stars of All Time in October 1997, Hanks is married to actress Rita Wilson, with whom he appeared in Volunteers (1985).

Filmography
Saving Private Ryan
The Green Mile
Forrest Gump
Road to Perdition
Apollo 13
Philadelphia
Toy Story
Cast Away

FIG. 3

| Metadata Categories | Content |  |  |  |  |  |  |  |  |  |  |  |  |  |  |  |  |  |  |  |  |  | Cast |  |  | Collaborative |  |  |  | Instance |  |  |  |  |  |
|---|---|---|---|---|---|---|---|---|---|---|---|---|---|---|---|---|---|---|---|---|---|---|---|---|---|---|---|---|---|---|---|---|---|---|---|
|  | Title | Year | Studio/Publisher | Episode Name | Synopsis | Description | Plot Keywords | Producer | Director | Principal Cast | Extended Cast | Artist | Writers | Category | Genre | Airing (P,F,R) | Runtime | Rating | Picture/Cover art | Tracks | Trailers | Content Lookup | Bios | Credits | Photo | User Rating | Editorial Rating | Critical Reviews | Links to other Media | System ID | Time | Location | Price | Usage Restrictions | Copy Restrictions |
| TV Browser/PVR | X | X |  | X | X | X | X |  |  | X |  |  |  | X | X | X | X | X | X |  |  |  |  |  | X |  |  |  |  | X | X | X |  |  |  |
| TMS | X | X | M | X | X | X | X | X | X | X |  |  | X | X | X | X | X | X |  |  |  |  |  |  |  |  | M |  |  |  | X | X | P |  |  |
| Gemstar |  |  |  |  |  |  |  |  |  |  |  |  |  |  |  |  |  |  |  |  |  |  |  |  |  |  |  |  |  |  |  |  |  |  |  |
| MSO | X |  |  |  |  |  |  |  |  |  |  |  |  |  |  |  |  |  |  |  |  |  |  |  |  |  |  |  |  | X |  | X |  |  |  |
| VOD Browser | X | X |  | X | X | X | X | X | X | X | X |  |  | X | X |  | X | X | X | ? |  |  |  | X | X |  |  |  |  | X | X | X | X | X |  |
| Muze | X | X |  |  |  |  |  |  |  |  |  |  |  |  |  |  | X | X | X |  |  |  |  |  |  |  |  |  |  |  |  |  |  |  |  |
| IMDB | X | X |  |  | X | X | X | X | X | X | X |  | X |  | X |  | X | X |  |  |  |  | X | ? |  | X |  | X | X |  |  |  | X |  |  |
| AllMovieGuide | X | X | X |  | X | X | X | X | X | X |  |  | X | X | X |  | X | X | X | D |  |  | X | X |  |  | X | X | X |  |  |  |  |  |  |
| Music Browser | X | X | X |  |  |  |  |  |  |  |  | X |  |  |  |  | X | X |  | X |  | X |  |  |  |  |  |  |  |  |  |  |  |  |  |
| AllMovieGuide |  |  | X |  |  |  |  |  |  |  |  |  |  |  |  |  | X |  |  |  |  |  | X |  |  |  | X | X | X |  |  |  |  |  |  |
| Muze | X | X | X |  |  |  |  |  |  |  |  | X |  |  | X |  | X |  | X |  |  |  |  |  |  |  |  |  |  |  |  |  |  |  |  |
| Gracenote | X | X |  |  |  |  |  |  |  |  |  | X |  |  | X |  | X |  | X | X |  | X |  |  |  |  |  |  |  |  |  |  |  |  |  |
| Freedb.org | X | X |  |  |  |  |  |  |  |  |  |  |  |  |  |  | X |  | ? | X |  | X |  |  |  |  |  |  |  |  |  |  |  |  |  |
| Musicbrainz.org | X | X |  |  |  |  |  |  |  |  |  | X |  |  |  |  | X |  |  | X |  | X |  |  |  |  |  |  |  |  |  |  |  |  |  |

| EVENT NAME 1 | APOLLO 13 |
| --- | --- |
| YEAR 1 | 1995 |
| LENGTH 1 | 120 MINUTES |
| STUDIO 1 | UNIVERSAL STUDIOS |
| RATING 1 | PG |
| EVENT DESCRIPTION 1 | NEAR DISASTER SPACE MISSION |
| MOVIE POSTER 1 | MOVIE POSTER |
| SEARCH INDEXES 1 | SEARCH INDEXES |
| PRICE 1 | 3.99 |
| TAXES 1 | 0.35 |
| PRICE RULES 1 | PRICE RULES |
| END DATE 1 | 5/5/2005 |

| EVENT NAME 2 | TOP GUN |
| --- | --- |
| YEAR 2 | 1986 |
| LENGTH 2 | 110 MINUTES |
| STUDIO 2 | PARAMOUNT PICTURES |
| RATING 2 | PG |
| EVENT DESCRIPTION 2 | NAVAL AVIATOR TRAINING SCHOOL |
| MOVIE POSTER 2 | MOVIE POSTER |
| SEARCH INDEXES 2 | SEARCH INDEXES |
| PRICE 2 | 3.99 |
| TAXES 2 | 0.35 |
| PRICE RULES 2 | PRICE RULES |
| END DATE 2 | 6/5/2005 |

METHODS AND APPARATUSES FOR VIDEO ON DEMAND (VOD) METADATA ORGANIZATION

RELATED APPLICATION

This application is related to, and claims priority from, U.S. Provisional Patent Application Ser. No. 60/575,313, filed on May 28, 2004, entitled "Method and Apparatus for Metadata Organization for Video on Demand (VOD) Systems", the disclosure of which is incorporated here by reference.

BACKGROUND

The present invention describes systems and methods for efficiently supplying multimedia metadata usable to create, for example, sophisticated entertainment user interfaces in the home through optimizing Video on Demand (VOD) metadata delivery.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds and potentially thousands of channels of shows and information. Video-on-demand technology, currently used primarily in hotels and the like, provides the potential for in-home entertainment selection from among thousands of movie titles. Digital video recording (DVR) equipment such as offered by TiVo, Inc., 2160 Gold Street, Alviso, Calif. 95002, further expand the available choices.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface and control device options and frameworks for televisions have not changed much over the last 30 years. Printed guides are still the most prevalent mechanism for conveying programming information. The multiple button remote control with simple up and down arrows is still the most prevalent channel/content selection mechanism. The reaction of those who design and implement the TV user interface to the increase in available media content has been a straightforward extension of the existing selection procedures and interface objects. Thus, the number of rows and columns in the printed guides has been increased to accommodate more channels. The number of buttons on the remote control devices has been increased to support additional functionality and content handling. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

An exemplary control framework having a zoomable graphical user interface for organizing, selecting and launching media items is described in U.S. patent application Ser. No. 10/768,432, filed on Jan. 30, 2004 to Frank A. Hunleth, the disclosure of which is incorporated here by reference. This framework provides exemplary solutions to the aforedescribed problems of conventional interfaces. Among other things, such exemplary frameworks provide mechanisms which display metadata associated with media items available for selection by a user in a manner which is easy-to-use, but allows a large number of different media items to be accessible.

The creation of these types of advanced user interfaces is hamstrung by the type and availability of rich metadata that describes the content. The term "metadata" as it is used herein refers to all of the supplementary information that describes the particular content of interest associated with media items available for selection by a user. As an example for movies, the metadata could include, e.g., the title, description, genre, cast, DVD cover art, price/availability, and rights associated with the content among others. Beyond this it could include cast bios and filmographies, links to similar movies, critical reviews, user reviews, and the rights associated with the metadata itself. It could also include advertising metadata that is linked to the content of interest. However these types of metadata are not currently available for use in generating user interfaces for several reasons. First, the universe of service providers that offer metadata is fragmented with various vendors supplying only a limited subset of the metadata information and usually in proprietary form. Second, to utilize these types of metadata would require sophisticated software processing that links the disparate pieces of metadata into a unifying set that is easy to consume by, for example, typically lower-end client devices in the home (e.g., set-top boxes). An exemplary method and system for enabling the capturing, processing, synthesizing and forwarding of metadata suitable to enable advanced user interfaces to be generated is described in U.S. patent application Ser. No. 11/037,897, filed on Jan. 18, 2005, the disclosure of which is incorporated here by reference.

With these and other improvements to control frameworks and user interfaces related to metadata information, more metadata information can be expected to become available from content deliverers. However, current metadata delivery systems, e.g., those associated with Electronic Program Guides (EPGs) include data delivery carousels fort which the data update mechanism is primitive and may be unable to handle the growing amount of metadata that needs to be transmitted in a timely manner. This problem is particularly relevant for Video on Demand (VOD) metadata due to the variable time frame of potential VOD events.

Accordingly, it would be desirable to provide methods and systems to optimize VOD metadata deliver.

SUMMARY

Various methods and systems for transmitting VOD metadata are described herein. VOD metadata can be filtered, processed and/or organized prior to being packetized for transmission to client devices. The filtering, processing and/or organization can, for example, be based on a time duration associated with VOD media items and/or by groups of information elements available within the sets of metadata.

According to one exemplary embodiment of the present invention, a method for processing metadata includes the steps of receiving a plurality of sets of metadata, each set of metadata having a plurality of information elements associated with a media item, grouping the sets of metadata based upon a time value associated with one of the plurality of information elements in each set of metadata, generating packets of metadata based on the groups and loading the packets of metadata into a data carousel.

According to another exemplary embodiment of the present invention, a client device for receiving video-on-demand (VOD) metadata includes a receiver for receiving the VOD metadata in packets, the VOD metadata having been filtered based upon a time during which each media item associated with each corresponding set of VOD metadata will be available for selection and a processor for generating a user interface screen based on the received VOD metadata.

According to yet another exemplary embodiment of the present invention, a distribution node for transmitting video-on-demand (VOD) metadata includes a transmitter for transmitting the VOD metadata in packets, the VOD metadata having been filtered based upon a time during which each media item associated with each corresponding set of VOD metadata will be available for selection.

BRIEF DESCRIPTION OF THE DRAWINGS

The accompanying drawings illustrate exemplary embodiments of the present invention, wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Figure 1:
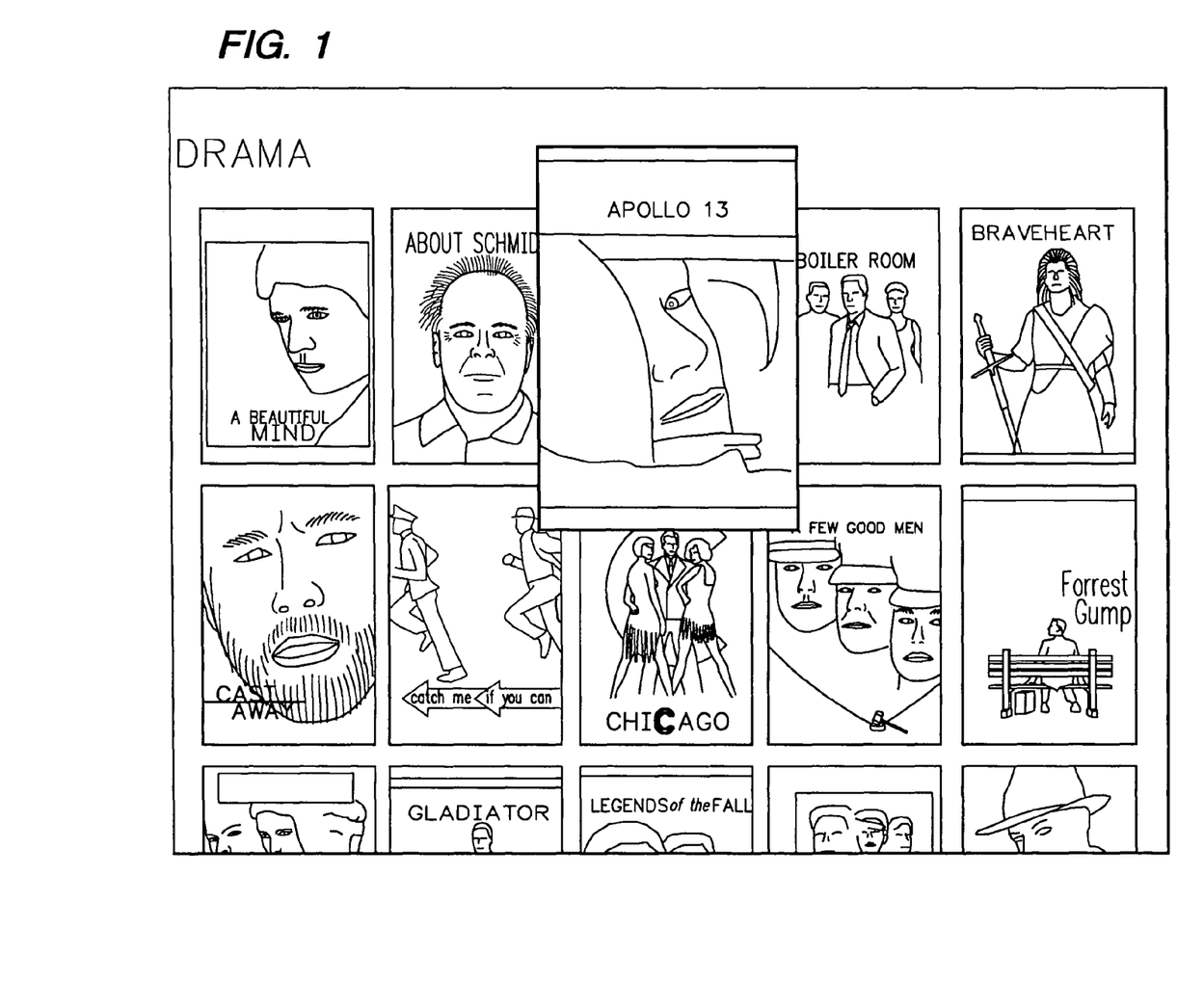
FIG. 1 depicts a screen of a user interface which can be generated using metadata processed in accordance with the present invention.

In order to provide some context for this discussion, an exemplary user interface screen which can be created using VOD metadata delivered in accordance with exemplary embodiments of the present invention is shown in FIG. 1. Therein, a portion of a user interface screen has been magnified to show ten media selection items in more detail. For more information regarding this purely exemplary interface, including previous screens and navigation techniques, the interested reader is directed to the above-incorporated by reference U.S. patent application Ser. No. 10/768,432. However for the purposes of this specification, it is primarily useful to see an exemplary end result of metadata processing in accordance with the present invention.

Figure 2:
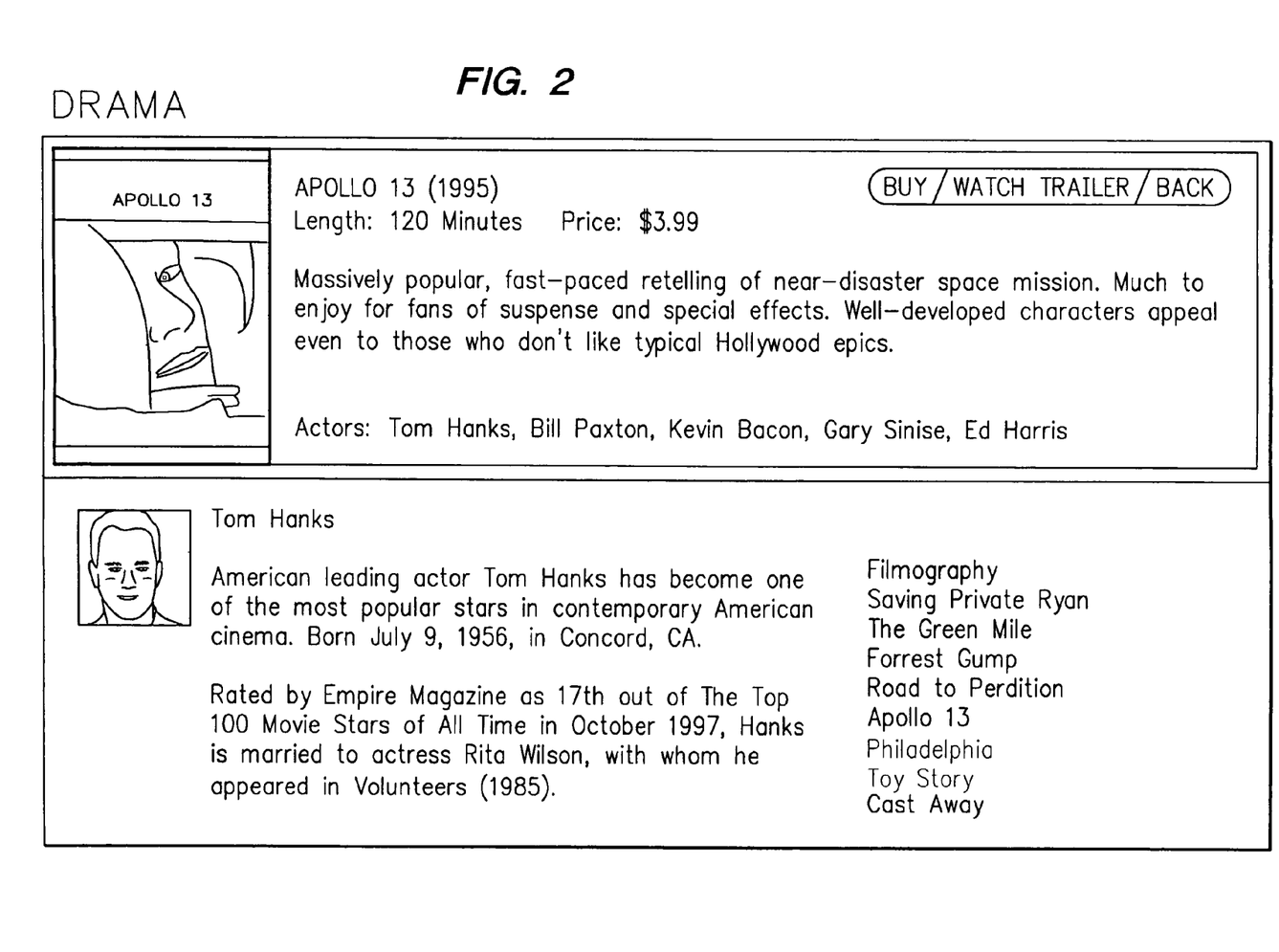
FIG. 2 depicts another screen of a user interface which can be generated using metadata processed in accordance with the present invention.
Figure 3:
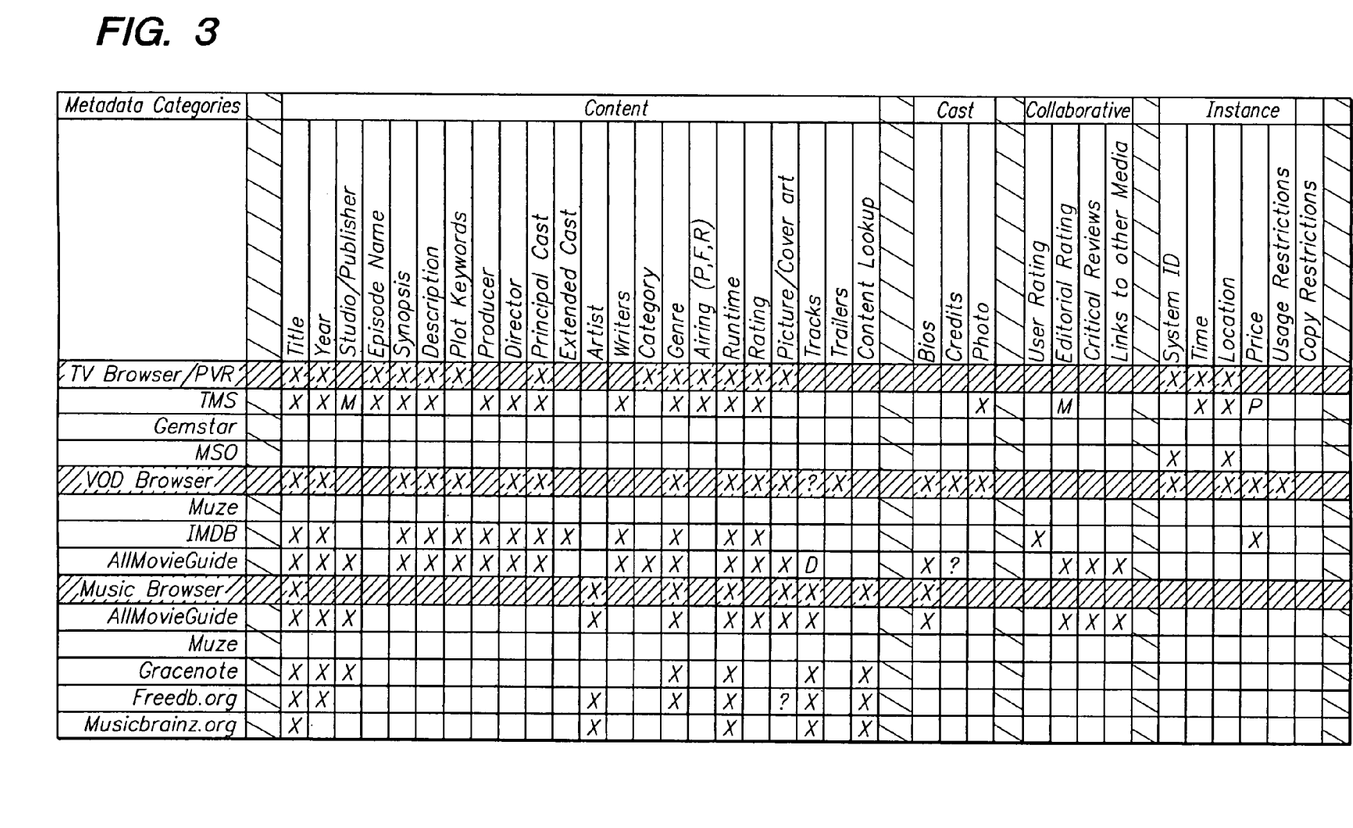
FIG. 3 is a table showing exemplary metadata types and sources.

Therein, the image associated with the media selection item for the movie "Apollo 13" has been magnified by, e.g., passing a cursor (not shown) over this image. Some metadata, e.g., the movie title and a representative image, can be used to generate this interface screen. At lower levels of the selection process, more metadata can be used. For example, as shown in FIG. 2, user selection of this magnified image, e.g., by depressing a button on an input device (not shown), can result in a further zoom to display additional details. For example, information about the movie "Apollo 13" including, among other things, the movie's runtime, price and actor information is shown. Those skilled in the art will appreciate that other types of information could be provided here. Additionally, this GUI screen includes GUI control objects including, for example, button control objects for buying the movie, watching a trailer or returning to the previous GUI screen (which could also be accomplished by depressing the ZOOM OUT button on the input device). Hyperlinks generated from metadata processed in a manner described below can also be used to allow the user to jump to, for example, GUI screens associated with the related movies identified in the lower right hand corner of the GUI screen of FIG. 2 or information associated with the actors in this movie. In this example, some or all of the film titles under the heading "Filmography" can be implemented as hyperlinks which, when actuated by the user via the input device, will cause the GUI to display a GUI screen corresponding to that of FIG. 2 for the indicated movie. Some or all of the information used to generate the interface screens of FIGS. 1 and 2 comes from metadata provided by one or more metadata providers and processed in accordance with exemplary embodiments of the present invention as will now be described. Exemplary metadata types that could be received are listed in FIG. 3.

The interface screens shown in FIGS. 1 and 2 are purely exemplary and metadata processed in accordance with the present invention can be used to support other interfaces or purposes other than interface generation. Specific techniques for organizing and processing VOD metadata are described below according to exemplary embodiments of the present invention.

Figure 4:
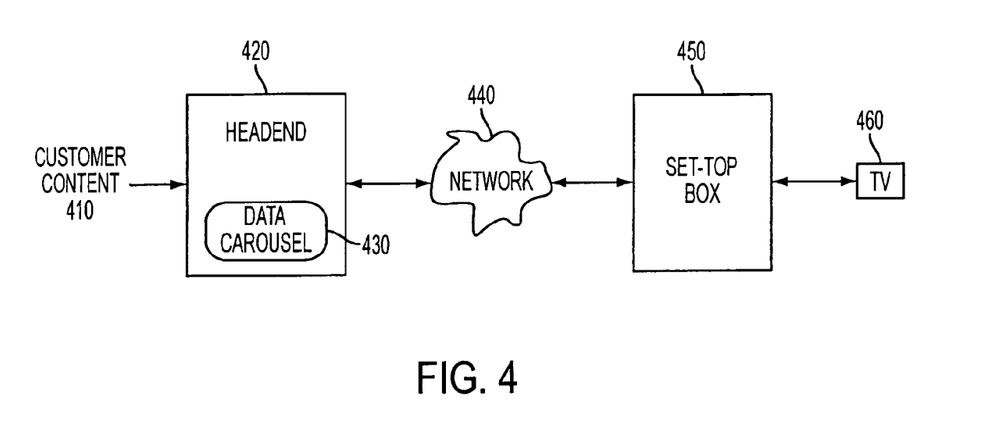
FIG. 4 depicts the process flow of metadata according to an exemplary embodiment of the present invention.

FIG. 4 illustrates a generalized system for delivering metadata and content in which the present invention can be implemented. Therein, VOD metadata follows a flow path as illustrated in FIG. 4. Initially, customer content 410 from one or a number of content providers is received by a head end unit 420. This metadata is transmitted from the head end 420 through a network 440 and is received at a customer location by, for example, a set-top box 450. The client side device could, alternatively, be a personal computer or any other processing device capable of handling metadata and video content for presentation to a user.

One technique for organizing the metadata for transmission is to use a data (or object) carousel 430, although the present invention is not so limited. The data carousel 430 transmits a data set repeatedly (continuous cycle) in a standard format. The set-top box 450 receives the metadata and processes the metadata into a format which can then be displayed on a customer device, such as a TV 460, e.g., in the manner described above with respect to FIGS. 1 and 2. The metadata tends to flow from the headend 420 to the set-top box 450, however, upstream communications are possible. For example, when a user makes a request for a VOD item to be delivered via a remote control device (not shown), the metadata-based image on the TV 460 could change when the request is processed by the set-top box 450. The set-top box 450 passes the request upstream for the desired VOD selection to be delivered. The above example describes a generalized system with only single inputs and outputs. Those skilled in the art will understand that the above system could have multiple inputs and multiple outputs at each step of the process. For a more detailed description of an interactive television architecture in which the present invention can be implemented, the interested reader is pointed to U.S. Pat. No. 6,804,708 B1, issued on Oct. 12, 2004, the disclosure of which is incorporated here by reference.

When a user makes a request through set-top box 450, the amount of delay associated with generating a user interface screen may be partially dependent upon how much metadata is in the data carousel 430 and how efficiently that metadata is organized. To reduce this potential delay methods and systems according to exemplary embodiments of the present invention for organizing metadata will be described below.

Figure 5:
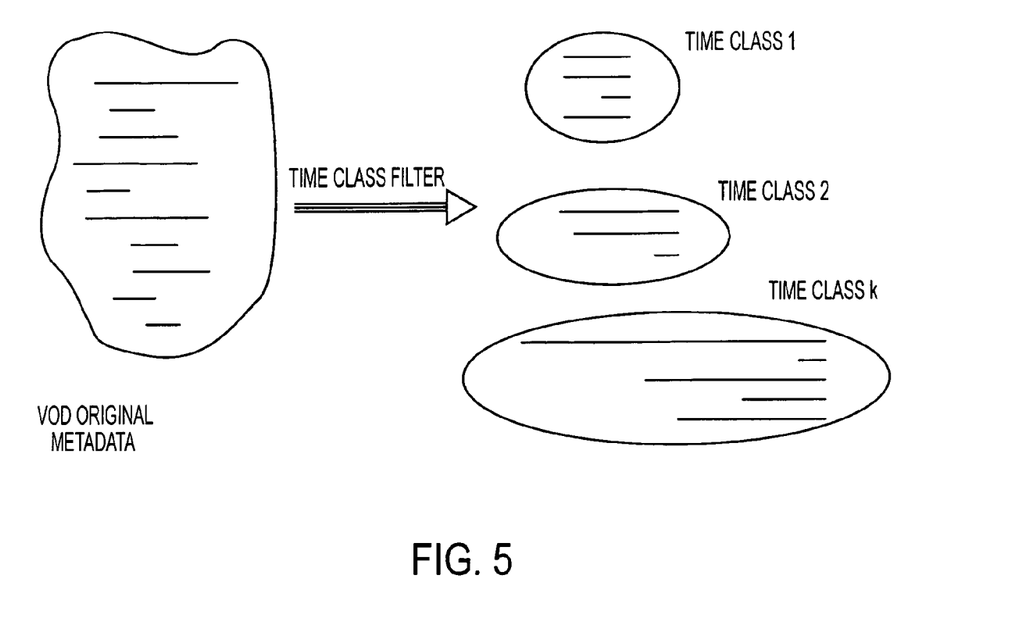
FIG. 5 depicts time class filtering of metadata according to an exemplary embodiment of the present invention.

Prior to transmitting metadata to the data carousel 430, the metadata is organized relative to the raw form in which it is received from the content providers. According to one exemplary embodiment of the present invention, the first organization step is to filter the metadata into time classes as depicted in FIG. 5. When the metadata is filtered, all metadata in the same class will have the same or similar event demonstration period end time. For example, if one content provider is running a movie that is available for purchase through the end of the current week, the metadata associated with that movie could be filtered into a different time class from VOD metadata associated with a concert that is available for purchase through the end of the next month. Depending on the types of metadata available and their associated event demonstration period end time, there could be as many or as few time periods as needed for efficient organization.

According to another exemplary embodiment of the present invention the metadata describing each event can be separated into groups. For example, metadata groups could include one or more of front data (F-data), back data (B-data) and dynamic data (D-data). F-data includes data that will appear on, for example, higher level user interface screens, e.g., such as that shown in FIG. 1, such as event name, year and length. B-data can include VOD metadata that would, for example, be useful in user interface screens accessed by users seeking more information about an event than is seen from the F-data alone, such as event description and search indexes, e.g., as shown in FIG. 2. D-data includes information that can be changed without removing the event off of the list, such as price, taxes and rules that define potential price changes for instance coupons. Elements can be added or deleted from the data groups. Additionally, the same metadata can be placed in more than one group and the number of groups can vary.

According to another exemplary embodiment of the present invention, an optimization criterion can be used to further organize metadata. A criteria generation manager that generates optimization criteria C based on a content provider's preferences is created and used to further organize metadata. The preferences can be defined interactively, and then applied to F-data, B-data and D-data in such a manner to minimize criteria C. For example, if a content provider only wanted to supply the event name and never the event year, optimization criteria C could be applied to the F-data to only show event name and not the event year. As another example, if the content provider's price is always the same (constant) price, that data would be considered as a part of the F-data group and optimization criteria C could be applied to the D-data and F-data simultaneously. Criteria C can also operate to remove or move metadata from one category (for example D-data) to another category (for example F-data).

Figure 6:
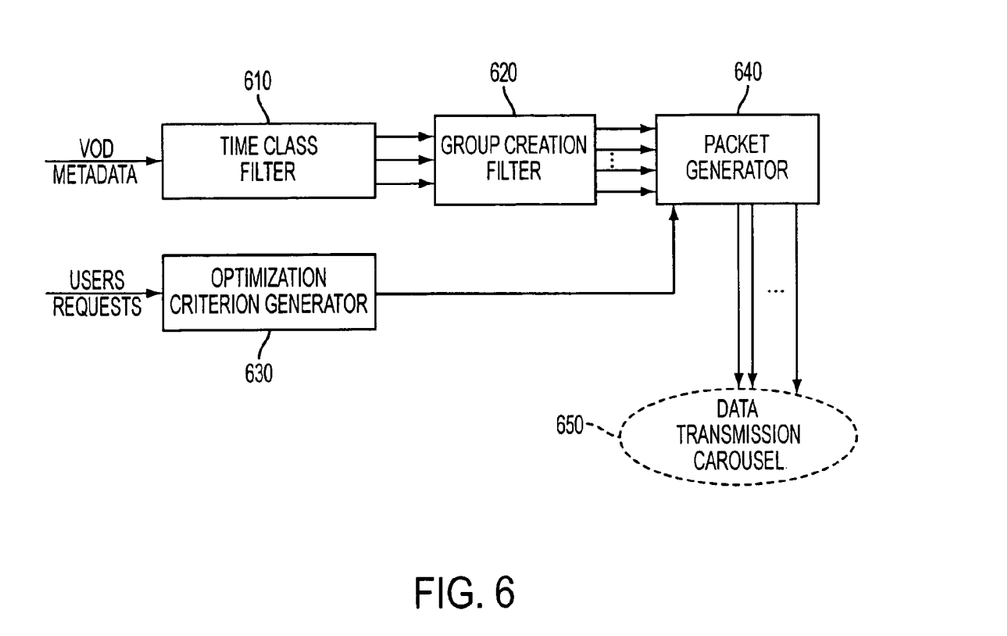
FIG. 6 depicts an apparatus in accordance with exemplary embodiments of the present invention.

As illustrated in FIG. 6, the above described filtering and organization techniques are shown operating in conjunction with each other to optimize metadata transmission to the data carousel. VOD metadata is processed through a time class filter 610 and filtered into as many time classes as needed based on the event demonstration period end time. These time filtered classes are then filtered into groups based on the group creation filter 620 based on data group types. Optimization criterion based upon user requests is created at step 630. These inputs are merged together at the packet generator 640. According to this exemplary embodiment, transmission packets are defined by time classes and groups, and these transmission packets are organized such that packets will be generated based on the same or similar time class and group and when possible, in a manner which minimizes criteria C. The packets are then forwarded to data carousel 650 for storage and subsequent forwarding to client devices. This allows for more efficient organization of VOD metadata in the data transmission carousel 650 which will in turn minimize the amount of unused metadata in the data transmission carousel 650.

Numerous variations of the foregoing exemplary embodiments are possible. For example, according to an exemplary embodiment of the present invention, the packet generator 640 provides data compression as part of the packet generation process to decrease bandwidth usage. Moreover, packets can be uploaded in a special order with variable frequency to minimize, for example, the download waiting time. Download waiting time refers to a time interval needed to download the data to, e.g., a plurality of client devices. Each packet can have its own download waiting time. A group of packets can be characterized by a maximum, minimum, or average waiting time. In one exemplary embodiment the download waiting time criteria used, for example to determine the uploading order to, e.g., the data carousel, refers to the average waiting time. In other exemplary embodiments the download waiting time criteria can be the maximum waiting time or a weighted average of the average waiting time and maximum waiting time.

To illustrate the manner in which exemplary embodiments of the present invention operate to filter, organize and process metadata, an illustrative set of metadata will be discussed.

Figure 7:
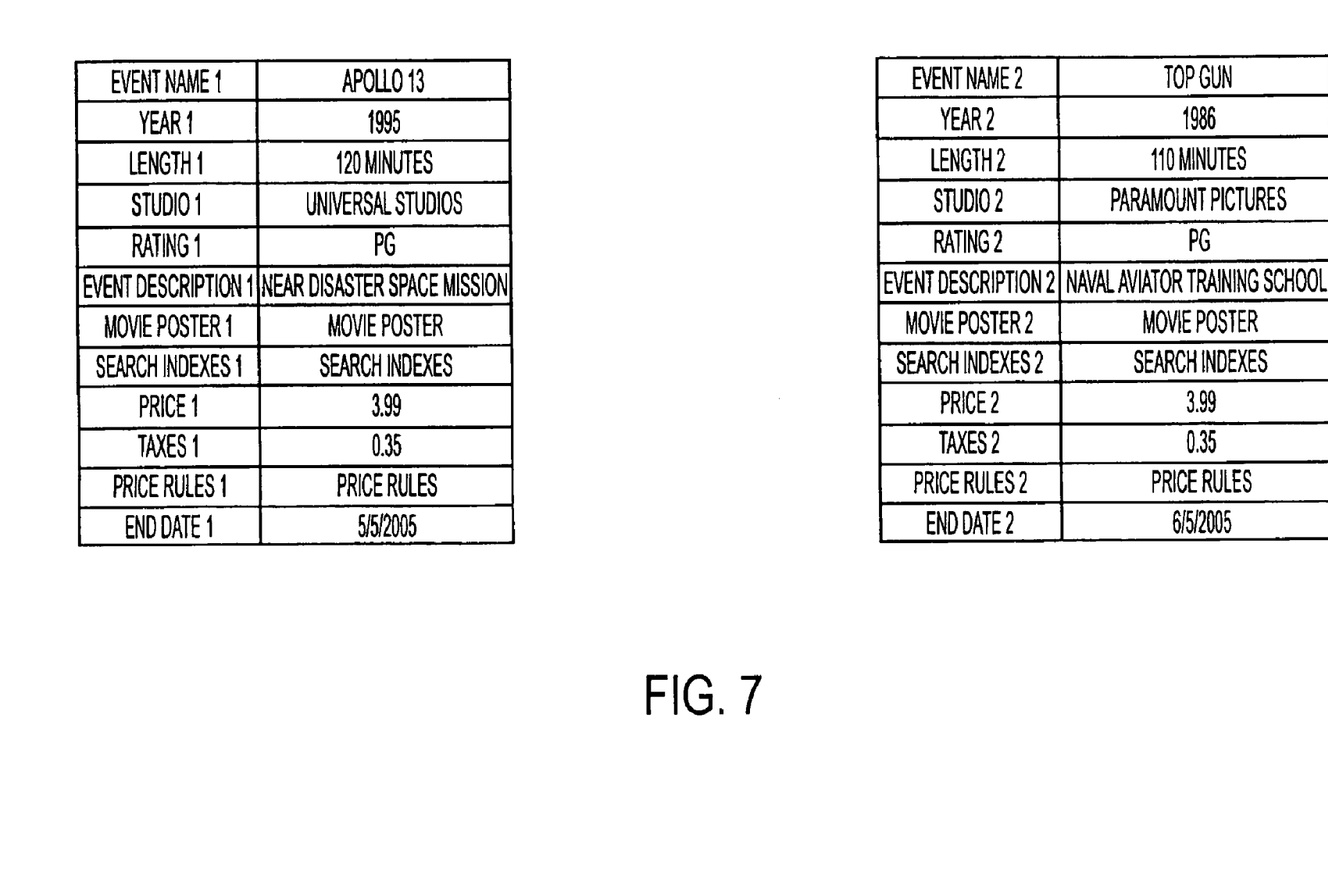
FIG. 7 depicts two groups of metadata according to an exemplary embodiment of the present invention.
Figure 8:
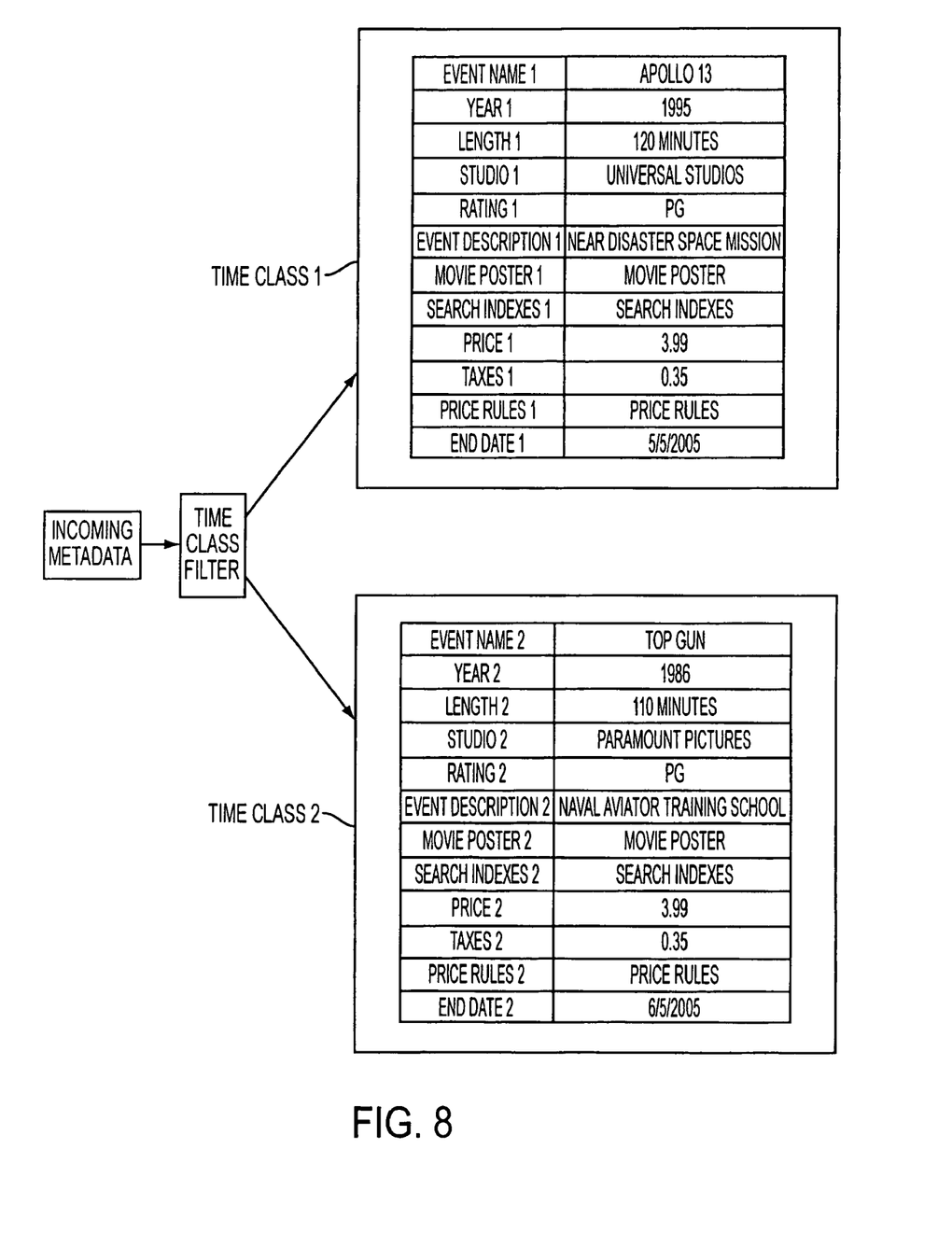
FIG. 8 depicts time class filtering of metadata according to an exemplary embodiment of the present invention.
Figure 9:
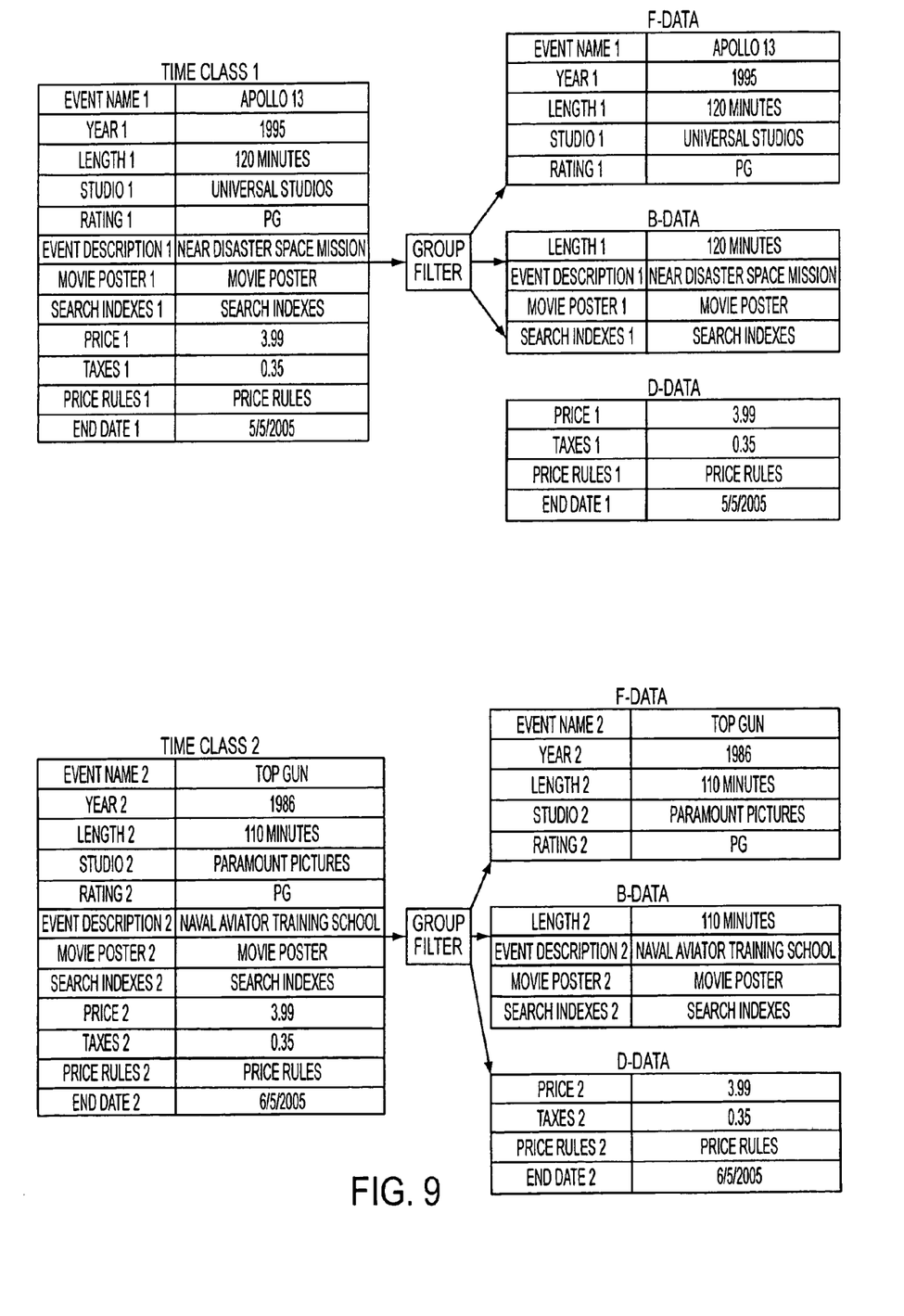
FIG. 9 depicts group filtering of metadata according to an exemplary embodiment of the present invention.
Figure 10:
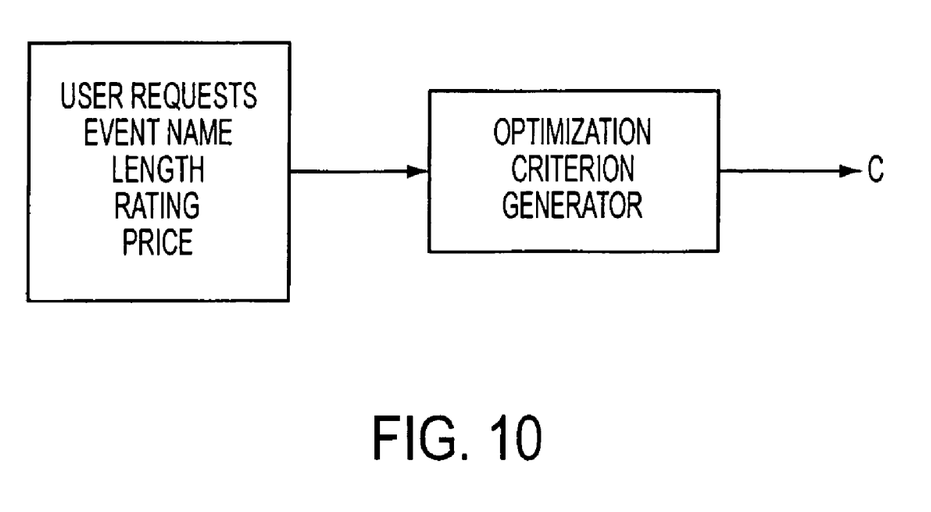
FIG. 10 illustrates the process flow for optimization criterion generation.
Figure 11:
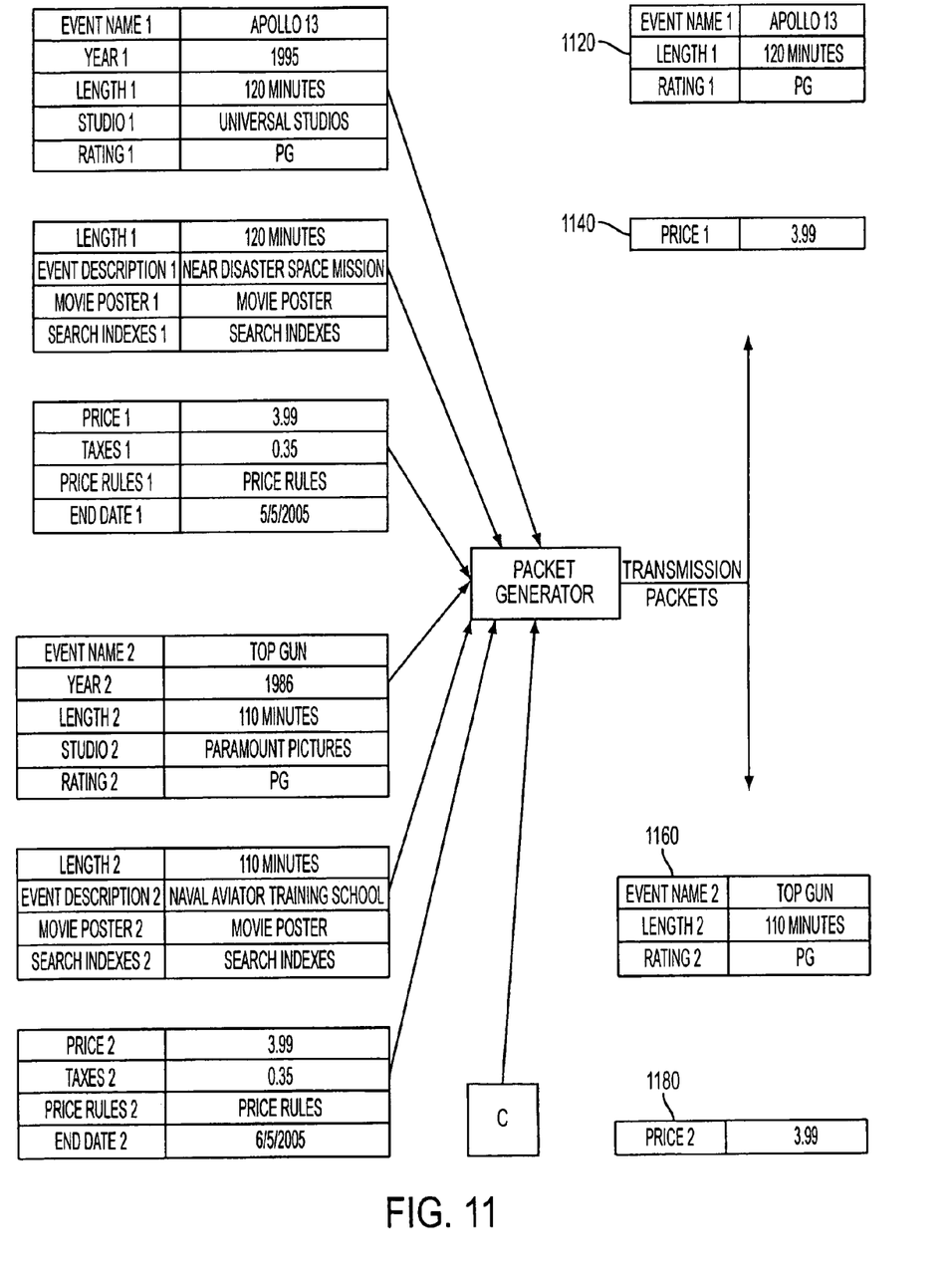
FIG. 11 illustrates packet generation according to an exemplary embodiment of the present invention.

Metadata, as shown in FIG. 7, is received by a headend unit 420. According to an exemplary embodiment of the present invention, the metadata of FIG. 7 is processed through a time class filter 610 and the outputs are put into different time classes based on the event end date as illustrated in FIG. 8. Each time class is then filtered through a group creation filter 620 and put into data groups as illustrated in FIG. 9. In this example, the metadata associated with each media item is broken up into the F-data, B-data and D-data groups described above. Optimization generated criterion C, as illustrated in FIG. 10, has been previously generated from, for example, cable service provider inputs and is sent to the packet generator 640. Additionally the outputs from the group creation filter 620 are sent to the packet generator 640. The packet generator 640 combines these inputs into transmission packets (1120, 1140, 1160 and 1180) as depicted in FIG. 11 to be sent to the data transmission carousel 650.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method for processing metadata associated with media items, comprising the steps of:
   receiving a plurality of sets of metadata, each set of metadata having a plurality of information elements associated with a video on demand (VOD) media item, one of said plurality of information elements in each set of metadata being an end of an event demonstration period, wherein said end of said event demonstration period includes an individual end date up to which a VOD media item associated with a corresponding set of metadata is available for selection said VOD media item that is associated with said set of metadata being delivered to any client upon request, at any time prior to said end of said event demonstration period;
   extracting subsets of the information elements from each of said sets of metadata, each subset including at least one information element corresponding to a same category of information wherein said extracted information elements include one of front data (F-data), back data (B-data) and dynamic data (D-data); wherein F-data includes data that appears on higher level user interface screens, wherein B-data is more information about an event, wherein D-data includes information that can be changed without removing the event off of the list;
   grouping said sets of metadata in different time classes depending on said end of said event demonstration period;
   generating packets of metadata based on said grouping and the extracted subsets of information elements; and
   loading said packets of metadata into a data carousel from which at least one of said packets is delivered to at least one client device.

2. The method of claim 1, further comprising:
   receiving a user request from a user;
   generating an optimization criterion based on said user request wherein said packets are generated using said optimization criterion.

3. The method of claim 1, further comprising the steps of:
   generating said packets using said extracted information elements, wherein said F-data corresponds to high level information that is initially requested by a user, said B-data corresponds to detailed information related to an event seen by said user in said high level information, and said D-data corresponds to information related to a price of each media item.

4. The method of claim 1, further comprising the steps of:
   forwarding said packets to the at least one client device.

5. A system for processing metadata associated with media items, the system comprising:
   means for receiving a plurality of sets of metadata, each set of metadata having a plurality of information elements associated with a video on demand (VOD) media item, one of said plurality of information elements in each set of metadata being an end of an event demonstration period, wherein said end of said event demonstration period includes an individual end date up to which a VOD media item associated with a corresponding set of metadata is available for selection said VOD media item that is associated with said set of metadata being delivered to any client upon request, at any time prior to said end of said event demonstration period;
   means for extracting subsets of the information elements from each of said sets of metadata, each subset including at least one information element corresponding to a same category of information wherein said extracted information elements include one of front data (F-data), back data (B-data) and dynamic data (D-data); wherein F-data includes data that appears on higher level user interface screens, wherein B-data is more information about an event, wherein D-data includes information that can be changed without removing the event off of the list;
   means for grouping said sets of metadata in different time classes depending on said end of said event demonstration period;
   means for generating packets of metadata based on said grouping and using the extracted information elements; and
   means for loading said packets of metadata into a data carousel from which at least one of said packets is delivered via a network to at least one client device.

6. The system of claim 5, wherein said end of said event demonstration period includes an individual end date up to which a VOD media item associated with a corresponding set of metadata is available for selection.

7. The system of claim 5, further comprising:
   means for optimizing packets configured to receive a user request from a user and to generate the optimization criterion based on said user request, wherein said means for generating use said optimizing criterion to generate said packets.

8. The system of claim 5, further comprising:
   mean for generating said packets using said extracted information elements, wherein said F-data corresponds to high level information that is initially requested by a user, said B-data corresponds to detailed information related to an event seen by said user in said high level information, and said D-data corresponds to information related to a price of each media item.

9. The system of claim 5, wherein said packets of metadata are forwarded to the at least one client device.

10. An apparatus for organizing VOD metadata associated with video on demand (VOD) media items, each VOD metadata having a plurality of information elements associated with a VOD media item, one of said plurality of information elements in each VOD metadata being an end of an event demonstration period, said VOD media item that is associated with said metadata being delivered to any client upon request, at any time prior to said end of said event demonstration period, the apparatus comprising:

an interface configured to receive the VOD metadata; and a processing unit including at least one processor, and which operates as (1) a filter configured to group a plurality of sets of metadata in a plurality of time classes based on an end of an event demonstration period; and (2) a packet generator configured to extract subsets of information elements from each of the sets of metadata, each subset including at least one information element corresponding to a same category of information wherein the extracted information elements include one of front F-data, back B-data and dynamic D-data, and to generate packets of VOD metadata based on said time classes and the extracted subsets of information elements and to load said packets of VOD metadata into a data carousel from which at least one of said packets is delivered via a network to at least one client device; wherein front data (F-data), back data (B-data) and dynamic data (D-data); wherein F-data includes data that appears on higher level user interface screens, wherein B-data is more information about an event, wherein D-data includes information that can be changed without removing the event off of the list;

wherein the interface is further configured to receive users requests, and the processing unit is further configured to provide an optimization criterion based on said user requests, wherein said optimization criterion is used in generating said packets.

11. The method of claim 2, wherein said optimization criterion specifies one or more categories of information for information elements among the plurality of information elements for each set of metadata, and said generating of the packets includes filtering each set of metadata according to said optimization criterion.

* * * * *